(12) United States Patent
Berkovich

(10) Patent No.: US 7,328,906 B1
(45) Date of Patent: Feb. 12, 2008

(54) STROLLER APPARATUS

(76) Inventor: Jasminka K. Berkovich, 12047 Califa St., #307, Valley Village, CA (US) 91607

( * ) Notice: Subject to any disclaimer, the term of this patent is extended or adjusted under 35 U.S.C. 154(b) by 57 days.

(21) Appl. No.: 11/294,108

(22) Filed: Dec. 6, 2005

(51) Int. Cl.
*B62M 1/04* (2006.01)

(52) U.S. Cl. ............... 280/47.38; 280/244; 280/247

(58) Field of Classification Search ............... 280/244, 280/247, 47.36, 47.38
See application file for complete search history.

(56) References Cited

U.S. PATENT DOCUMENTS

| | | | | |
|---|---|---|---|---|
| 3,589,749 A | * | 6/1971 | Byrd et al. | 280/211 |
| 3,666,292 A | * | 5/1972 | Bartos | 280/234 |
| 4,460,190 A | * | 7/1984 | Spiess | 280/247 |
| 4,712,790 A | * | 12/1987 | Szymski | 482/62 |
| 5,272,928 A | * | 12/1993 | Young | 74/137 |
| 5,674,165 A | | 10/1997 | Cohen et al. | |
| 5,679,101 A | | 10/1997 | Magid | |
| 5,762,593 A | | 6/1998 | Whiteley | |
| 5,826,897 A | * | 10/1998 | Beard | 280/250.1 |
| 5,876,309 A | | 3/1999 | Archey | |
| 6,032,970 A | * | 3/2000 | Porter | 280/234 |
| 6,196,947 B1 | | 3/2001 | Anderson | |
| D453,717 S | | 2/2002 | Hawker et al. | |
| D484,441 S | | 12/2003 | Hsia | |
| 6,942,234 B1 | * | 9/2005 | Chait | 280/244 |
| 7,000,934 B1 | * | 2/2006 | Capek | 280/234 |

\* cited by examiner

*Primary Examiner*—Jeff Restifo

(57) ABSTRACT

A stroller apparatus for exercising the arms and a portion of an upper torso of a user includes a seat to receive and support a rider. A frame is coupled to the seat to support the seat in an elevated position above a ground surface. A plurality of wheels is coupled to the frame. A crankshaft is rotatably coupled to the frame and releasably engages a pair of the wheels. The crankshaft rotates the associated pair of the wheels when the crankshaft is rotated with respect to the frame and engages the associated pair of the wheels. A pair of handle assemblies is operationally coupled to the crankshaft and pivotally coupled to the frame. One of the handle assemblies pivots in a direction opposite the other one of the handle assemblies in a substantially scissor like motion to rotate the crankshaft with respect to the frame.

12 Claims, 6 Drawing Sheets

STROLLER APPARATUS

BACKGROUND OF THE INVENTION

1. Field of the Invention

The present invention relates to exercise strollers and more particularly pertains to a new exercise stroller for exercising the arms and a portion of an upper torso of a user.

2. Description of the Prior Art

The use of exercise strollers is known in the prior art. U.S. Pat. No. 6,196,947 describes a system for using arm movement of a user during jogging to propel a stroller. Another type of exercise stroller is U.S. Pat. No. 5,876,309 having a stroller that allows a user to move their arms in a more natural motion when jogging with the stroller. Another type of exercise stroller is U.S. Pat. No. 5,674,165 having a device that is coupled to a stroller to allow the arms of user to move in a more natural motion when jogging with the stroller.

While these devices fulfill their respective, particular objectives and requirements, the need remains for a device that has certain improved features such as a crankshaft that allows for the entire motion of the users arms to propel the stroller across a surface while using the weight of the stroller to provide resistance to the arms of the user to work the arms of the user during extension and retraction.

SUMMARY OF THE INVENTION

The present invention meets the needs presented above by generally comprising a seat to receive and support a rider. A frame is coupled to the seat to support the seat in an elevated position above a ground surface. A plurality of wheels is coupled to the frame and engages the ground surface. Each of the wheels rolls across the ground surface when the frame and the seat are being moved. A crankshaft is rotatably coupled to the frame and releasably engages a pair of the wheels. The crankshaft rotates the associated pair of the wheels to propel the frame and the seat across the ground surface when the crankshaft is rotated with respect to the frame and the crankshaft is engaged with the associated pair of the wheels. A pair of handle assemblies are operationally coupled to the crankshaft and pivotally coupled to the frame. One of the handle assemblies pivots in a direction opposite the other one of the handle assemblies in a substantially scissor like motion to rotate the crankshaft with respect to the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
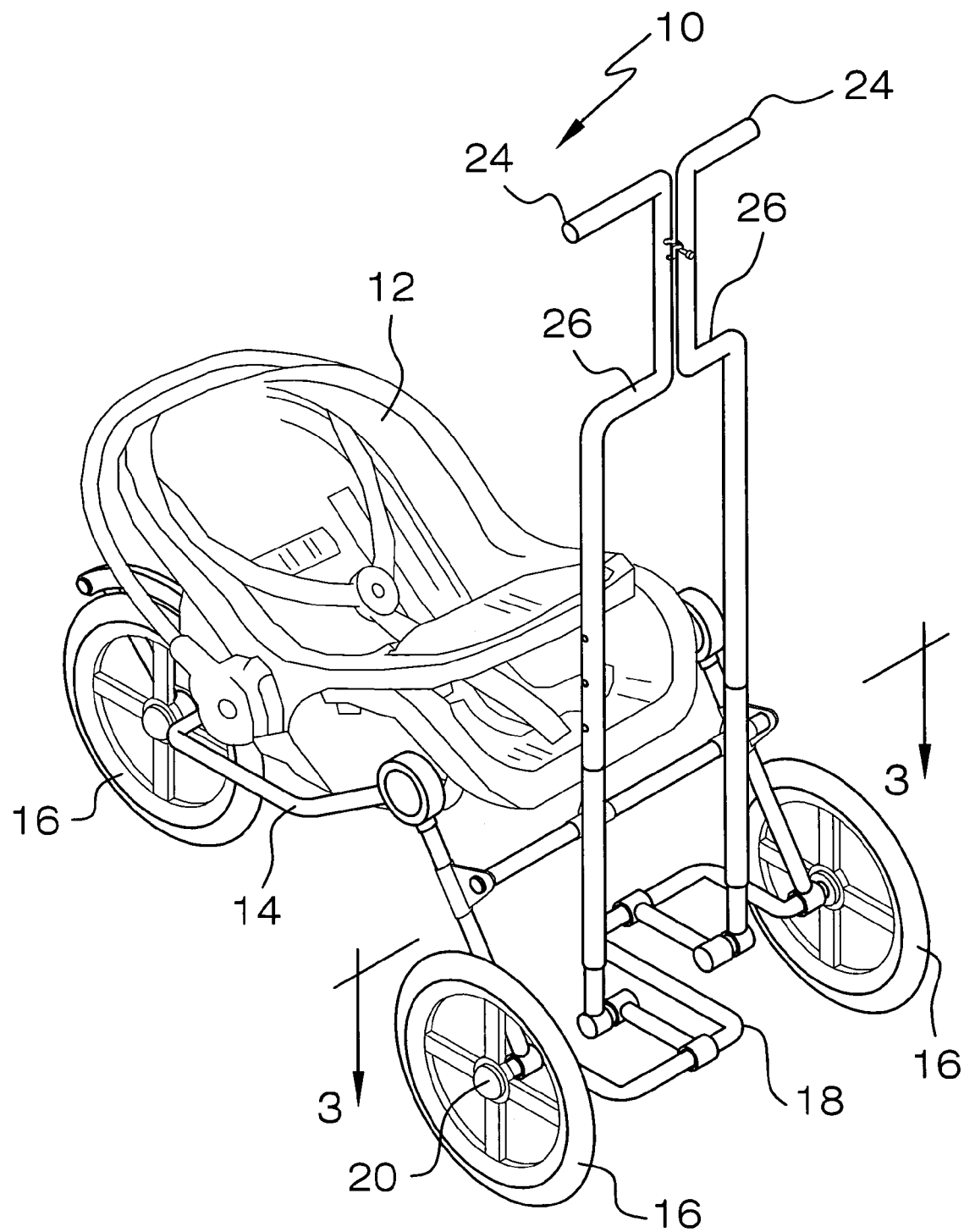
FIG. 1 is a perspective view of a stroller apparatus according to the present invention.
Figure 2:
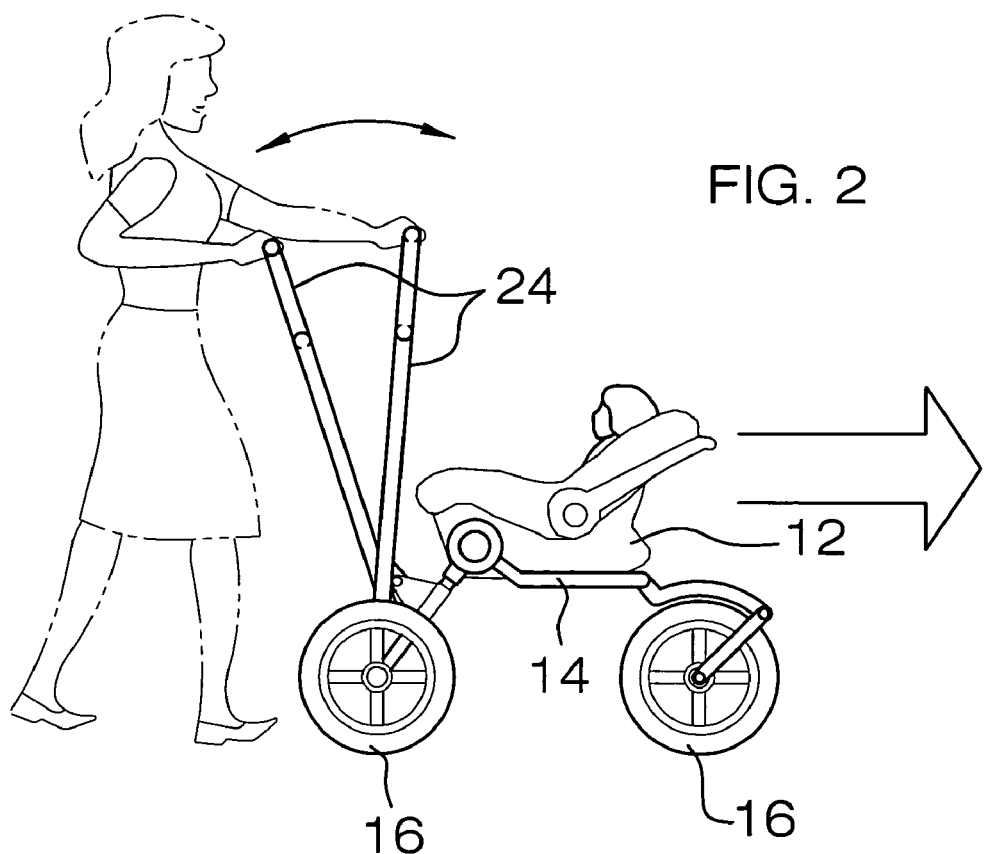
FIG. 2 is a side view of the present invention shown in use.
Figure 3:
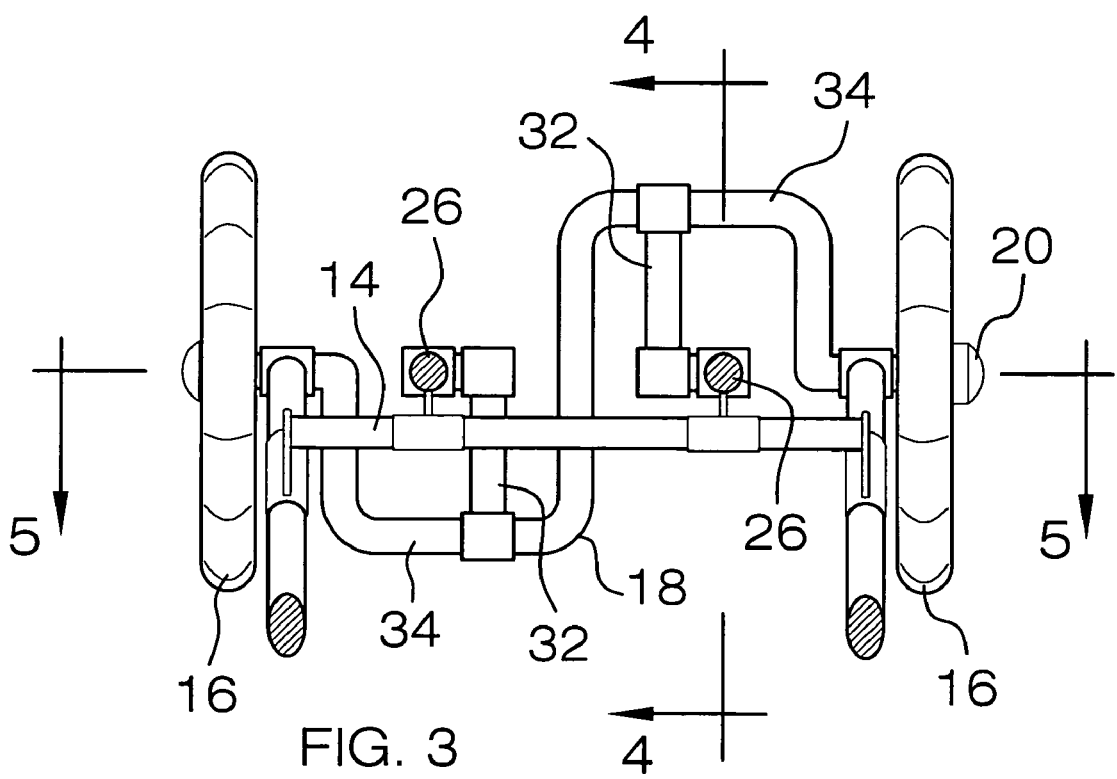
FIG. 3 is a cross-sectional view of the present invention taken along line 3-3 of FIG. 1.
Figure 4:
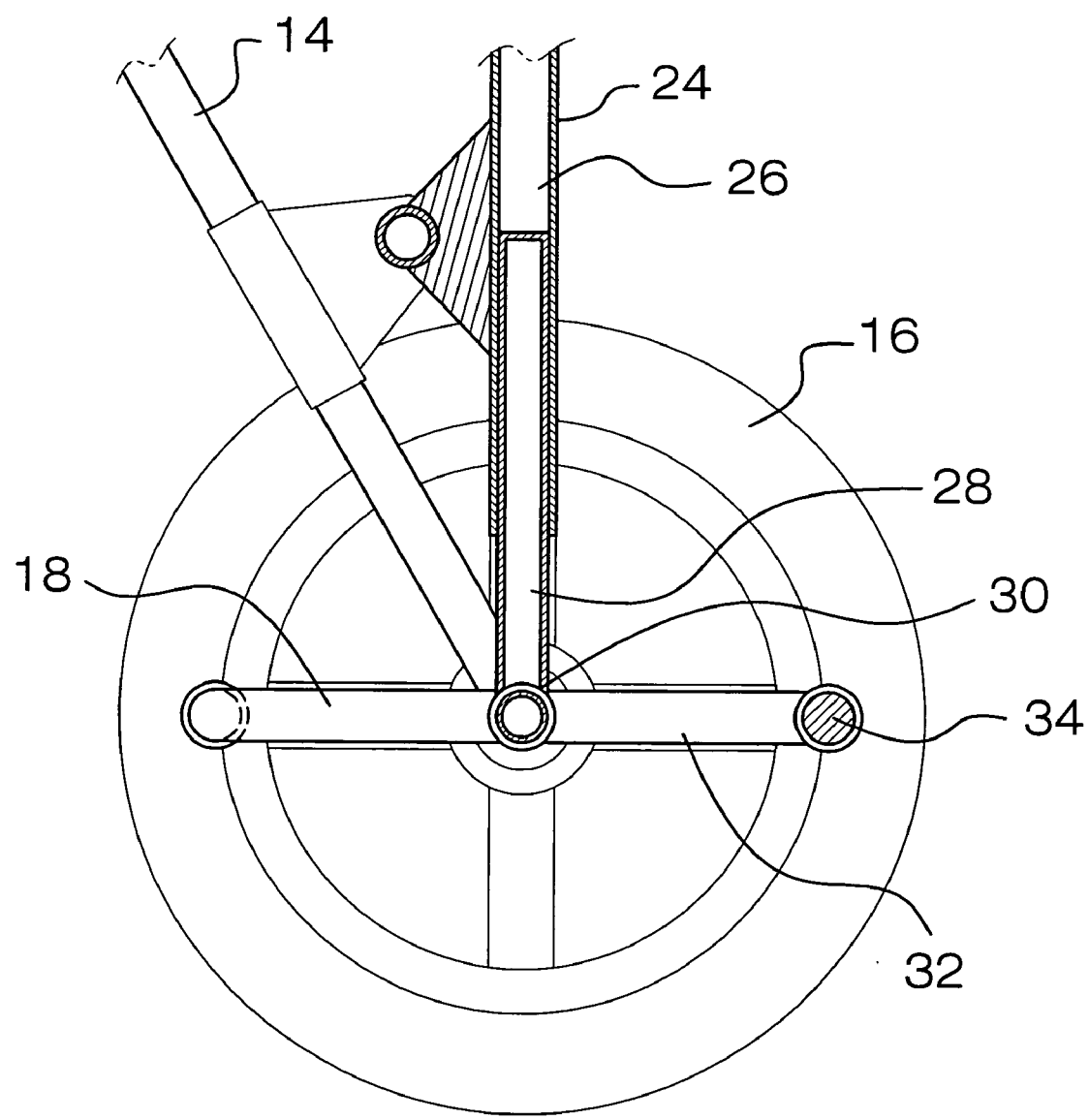
FIG. 4 is a cross-sectional view of the present invention taken along line 4-4 of FIG. 3.
Figure 5:
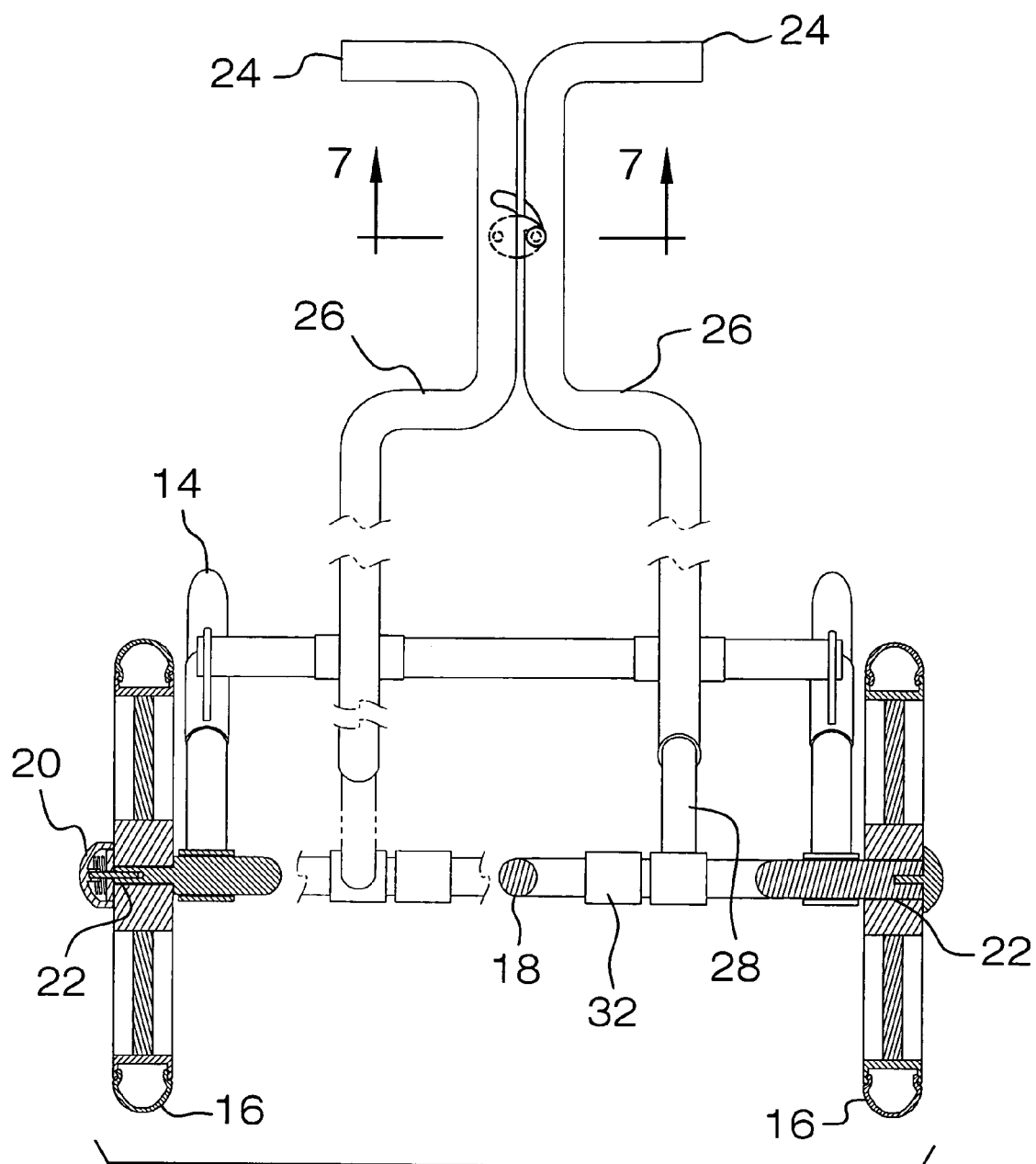
FIG. 5 is a cross-sectional view of the present invention taken along line 5-5 of FIG. 3.
Figure 6:
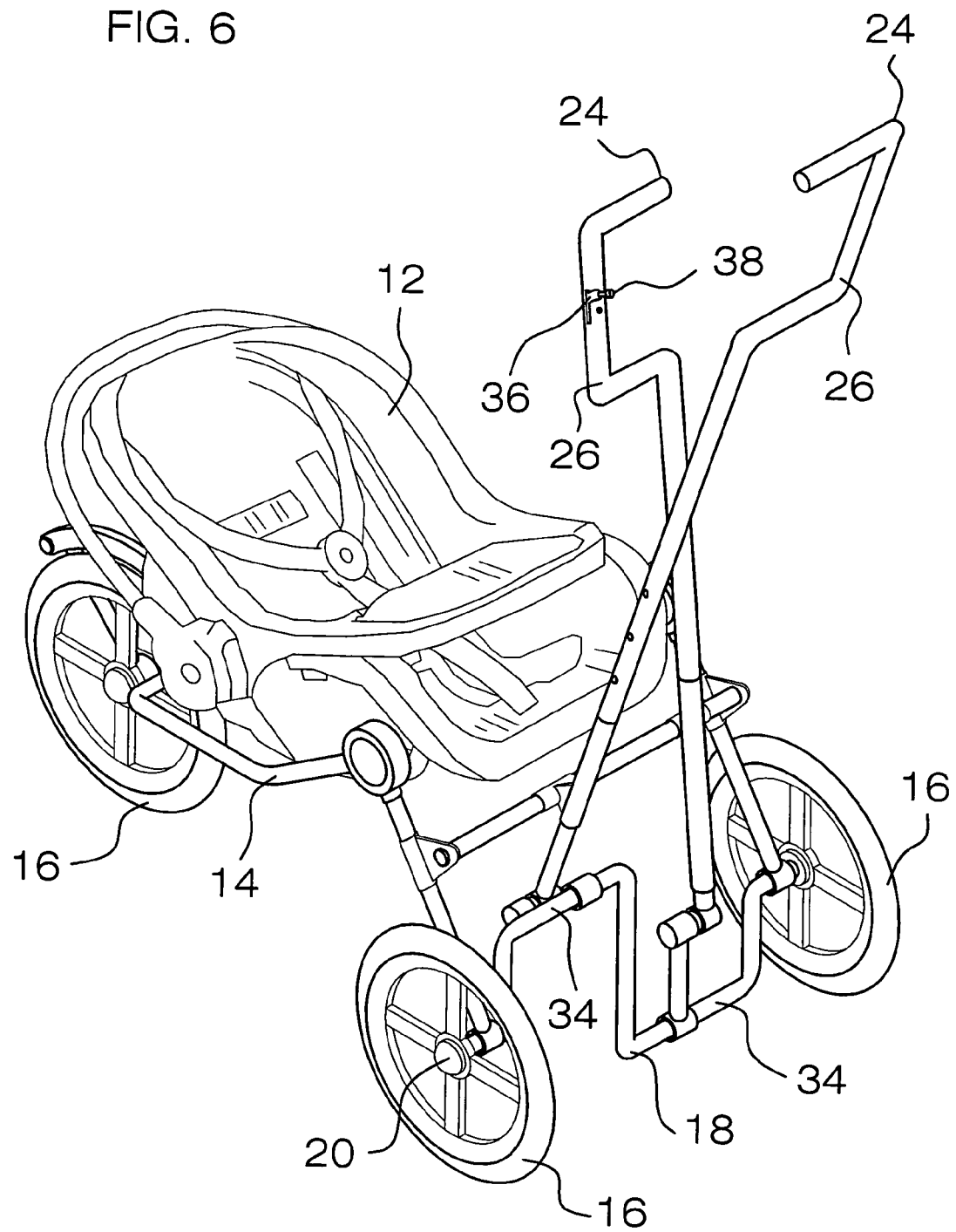
FIG. 6 is a perspective view of the present invention showing the handle assemblies rotated with respect to one another.
Figure 7:
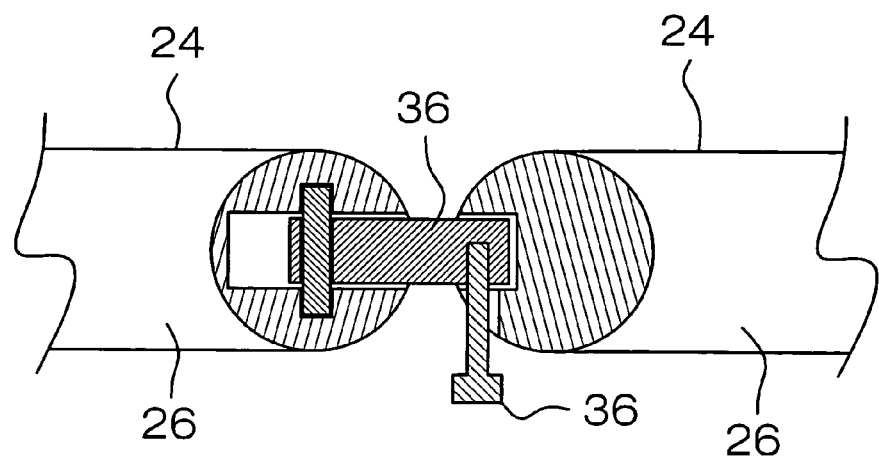
FIG. 7 is a cross-sectional view of the present invention taken along line 7-7 of FIG. 5.
Figure 8:
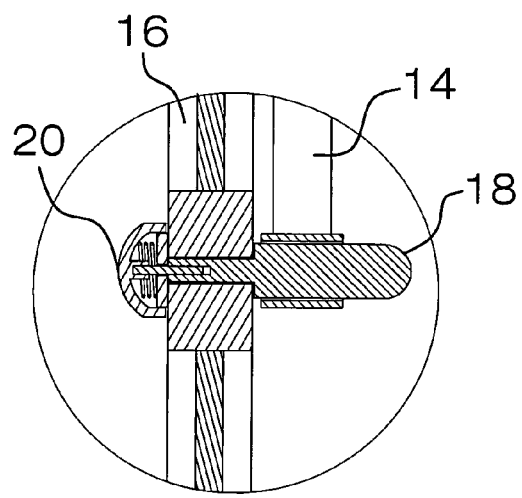
FIG. 8 is a cross-sectional view of the hub assembly of the present invention shown in the first position.
Figure 9:
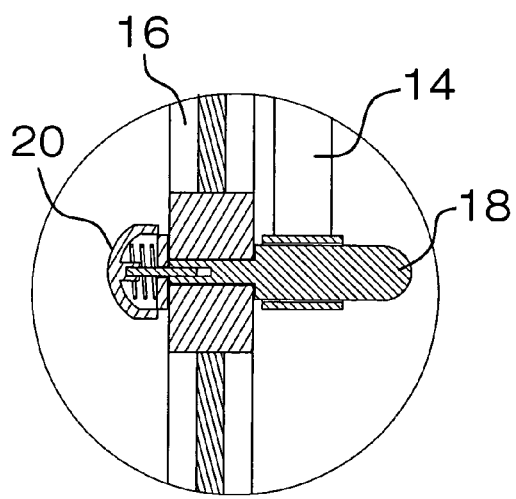
FIG. 9 is a cross-sectional view of the hub assembly of the present invention shown in the second position.

With reference now to the drawings, and in particular to FIGS. 1 through 9 thereof, a new exercise stroller embodying the principles and concepts of the present invention and generally designated by the reference numeral 10 will be described.

As best illustrated in FIGS. 1 through 9, the stroller apparatus 10 generally comprises a seat 12 to receive and support a rider. A frame 14 is coupled to the seat 12 to support the seat 12 in an elevated position above a ground surface. A plurality of wheels 16 is coupled to the frame 14 and engages the ground surface. Each of the wheels 16 rolls across the ground surface when the frame 14 and the seat 12 are being moved.

A crankshaft 18 is rotatably coupled to the frame 14 and is releasably engaged to a pair of the wheels 16. The crankshaft 18 rotates the associated pair of the wheels 16 to propel the frame 14 and the seat 12 across the ground surface when the crankshaft 18 is rotated with respect to the frame 14 and the crankshaft 18 is engaged with the associated pair of the wheels 16. A hub assembly 20 is coupled to one of a pair of opposing ends 22 of the crankshaft 18. The hub assembly 20 is actuated to a first position to engage the crankshaft 18 to one of the associated pair of the wheels 16 when the crankshaft 18 is to be used to rotate the one of the associated pair of the wheels 16 or to a second position to disengage the crankshaft 18 from the one of the associated pair of the wheels 16 when the wheels 16 are to rotate independently of the crankshaft 18. The hub assembly 20 is preferably threadably coupled to the crankshaft 18 and may be moved to the first position by tightening the hub on the crankshaft 18 and thereby secure the wheel 16 to the crankshaft 18.

A pair of handle assemblies 24 is operationally coupled to the crankshaft 18 and pivotally coupled to the frame 14. One of the handle assemblies 24 pivots in a direction opposite the other one of the handle assemblies 24 in a substantially scissor like motion to rotate the crankshaft 18 with respect to the frame 14. Additionally, the scissor like motion of the handle assemblies 24 causes the arms of the user to be extended away from and retracted to the torso of the user to exercise the arms, shoulders and a portion of the torso of the user. Each of the handle assemblies 24 comprises an actuating arm 26 pivotally coupled to the frame 14. The actuating arm 26 pivots with respect to the frame 14 when the actuating arm 26 is pushed and pulled by a user. A length of the actuating arm 26 extending upwardly from the frame 14 is adjustable. A translation rod 28 is telescopically coupled to the actuating arm 26. A distal end 30 of the translation rod 28 with respect to the actuating arm 26 moves in a pendulum motion when the translation rod 28 telescopes from the actuating arm 26 and the actuating arm 26 is pivoted with respect to the frame 14. A linking arm 32 is rotatably coupled to one of a pair of crankpins 34 of the crankshaft 18 and rotatably coupled to the distal end 30 of the translation rod 28. The linking arm 32 converts pendulum motion of the translation arm into circular motion transferred to the associated one of the crankpins 34 of the crankshaft 18 to rotate the crankshaft 18.

A locking arm 36 is pivotally coupled to one of the handle assemblies 24 and is selectively extendable into a deployed position extending between the handle assemblies 24 and engaging the actuating arm 26 of the other of the handle assemblies 24 to inhibit pivoting of one of the handle assemblies 24 with respect to the other one of the handle assemblies 24. A latch pin 38 is coupled to the locking arm 36 to facilitate rotation of the locking arm 36 between the deployed position and the stored position.

In use, the hub assembly 20 is actuated to the first position to engage the crankshaft 18 to the associated one of the wheels 16. The user then grips the actuating arm 26 of each of the handle assemblies 24 and by pushing and pulling the handle assemblies 24 through the scissor like motion actuates the crankshaft 18 to rotate the associated one of the wheels 16 and thereby propels the frame 14 and seat 12 across the surface. When the user pushes and pulls the handle assemblies 24 the user works the arms, shoulders and a portion of the upper torso to propel the frame 14 and seat 12 across the surface. When the hub assembly 20 is actuated into the second position to disengaged the associated one of the wheels 16 from the crankshaft 18 and the locking arm 36 engages both handle assemblies 24, the wheels 16 roll freely from the crankshaft 18 thereby allowing the frame 14 and seat 12 to be moved freely across the surface without having to actuate the handle assemblies 24 in the scissor like motion.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stroller apparatus for exercising the upper body of a user of the apparatus while the apparatus is being pushed by a user, the apparatus comprises:
    a seat to receive and support a rider;
    a frame being coupled to said seat to support said seat in an elevated position above a ground surface;
    a plurality of wheels being coupled to said frame and engaging the ground surface, each of said wheels rolling across the ground surface when said frame and said seat are being moved;
    a crankshaft being rotatably coupled to said frame and being releasably engaged to a pair of said wheels, said crankshaft rotating the associated pair of said wheels to propel said frame and said seat across the ground surface when said crankshaft is rotated with respect to said frame and said crankshaft is engaged with the associated pair of said wheels; and
    a pair of handle assemblies being operationally coupled to said crankshaft and pivotally coupled to said frame, one of said handle assemblies pivoting in a direction opposite the other one of said handle assemblies in a substantially scissor like motion to rotate said crankshaft with respect to said frame, each of said handle assemblies including an actuating arm being pivotally coupled to said frame, said actuating arm pivoting with respect to said frame when said actuating arm is pushed and pulled by a user, a length of said actuating arm extending upwardly from said frame being adjustable, each of said handle assemblies includes a translation rod being telescopically coupled to said actuating arm, a distal end of said translation rod with respect to said actuating arm moving in a pendulum motion when said translation rod telescopes from said actuating arm and said actuating arm is pivoted with respect to said frame.

2. The apparatus according to claim 1, wherein each of said handle assemblies further includes a linking arm being rotatably coupled to one of a pair of crankpins of said crankshaft and rotatably coupled to said distal end of said translation rod, said linking arm converting pendulum motion of said translation arm into circular motion transferred to the associated one of said crankpins of said crankshaft to rotate said crankshaft.

3. The apparatus according to claim 1, further comprising a hub assembly being coupled to one of a pair of opposing ends of said crankshaft, said hub assembly being actuated to a first position to engage said crankshaft to one of the associated pair of said wheels or to a second position to disengage said crankshaft from the one of the associated pair of said wheels.

4. The apparatus according to claim 1, further comprising a locking arm being pivotally coupled to one of said handle assemblies and being selectively extendable into a deployed position extending between one of said handle assemblies and engaging the other of said handle assemblies to inhibit pivoting of one of said handle assemblies with respect to the other one of said handle assemblies.

5. The apparatus according to claim 4, further comprising a latch pin being coupled to said locking arm to facilitate rotation of said locking arm between said deployed position and said stored position.

6. A stroller apparatus for exercising the upper body of a user of the apparatus while the apparatus is being pushed by a user, the apparatus comprises:
    a seat to receive and support a rider;
    a frame being coupled to said seat to support said seat in an elevated position above a ground surface;
    a plurality of wheels being coupled to said frame and engaging the ground surface, each of said wheels rolling across the ground surface when said frame and said seat are being moved;
    a crankshaft being rotatably coupled to said frame and being releasably engaged to a pair of said wheels, said crankshaft rotating the associated pair of said wheels to propel said frame and said seat across the ground surface when said crankshaft is rotated with respect to said frame and said crankshaft is engaged with the associated pair of said wheels;

a pair of handle assemblies being operationally coupled to said crankshaft and pivotally coupled to said frame, one of said handle assemblies pivoting in a direction opposite the other one of said handle assemblies in a substantially scissor like motion to rotate said crankshaft with respect to said frame, each of said handle assemblies comprising;
   an actuating arm being pivotally coupled to said frame, said actuating arm pivoting with respect to said frame when said actuating arm is pushed and pulled by a user, a length of said actuating arm extending upwardly from said frame being adjustable;
   a translation rod being telescopically coupled to said actuating arm, a distal end of said translation rod with respect to said actuating arm moving in a pendulum motion when said translation rod telescopes from said actuating arm and said actuating arm is pivoted with respect to said frame;
   a linking arm being rotatably coupled to one of a pair of crankpins of said crankshaft and rotatably coupled to said distal end of said translation rod, said linking arm converting pendulum motion of said translation arm into circular motion transferred to the associated one of said crankpins of said crankshaft to rotate said crankshaft;
a hub assembly being coupled to one of a pair of opposing ends of said crankshaft, said hub assembly being actuated to a first position to engage said crankshaft to one of the associated pair of said wheels or to a second position to disengage said crankshaft from the one of the associated pair of said wheels;
a locking arm being pivotally coupled to one of said handle assemblies and being selectively extendable into a deployed position extending between said handle assemblies and engaging said actuating arm of the other of said handle assemblies to inhibit pivoting of one of said handle assemblies with respect to the other one of said handle assemblies.

7. A stroller apparatus for exercising the upper body of a user of the apparatus while the apparatus is being pushed by a user, the apparatus comprises:
   a seat to receive and support a rider;
   a frame being coupled to said seat to support said seat in an elevated position above a ground surface;
   a plurality of wheels being coupled to said frame and engaging the ground surface, each of said wheels rolling across the ground surface when said frame and said seat are being moved;
   a crankshaft being rotatably coupled to said frame and being releasably engaged to a pair of said wheels, said crankshaft rotating the associated pair of said wheels to propel said frame and said seat across the ground surface when said crankshaft is rotated with respect to said frame and said crankshaft is engaged with the associated pair of said wheels; and
   a pair of handle assemblies being operationally coupled to said crankshaft and pivotally coupled to said frame, one of said handle assemblies pivoting in a direction opposite the other one of said handle assemblies in a substantially scissor like motion to rotate said crankshaft with respect to said frame; and
   a hub assembly being coupled to one of a pair of opposing ends of said crankshaft, said hub assembly being actuated to a first position to engage said crankshaft to one of the associated pair of said wheels or to a second position to disengage said crankshaft from the one of the associated pair of said wheels.

8. The apparatus according to claim 7, wherein each of said handle assemblies includes an actuating arm being pivotally coupled to said frame, said actuating arm pivoting with respect to said frame when said actuating arm is pushed and pulled by a user, a length of said actuating arm extending upwardly from said frame being adjustable.

9. The apparatus according to claim 8, wherein each of said handle assemblies includes a translation rod being telescopically coupled to said actuating arm, a distal end of said translation rod with respect to said actuating arm moving in a pendulum motion when said translation rod telescopes from said actuating arm and said actuating arm is pivoted with respect to said frame.

10. The apparatus according to claim 9, wherein each of said handle assemblies further includes a linking arm being rotatably coupled to one of a pair of crankpins of said crankshaft and rotatably coupled to said distal end of said translation rod, said linking arm converting pendulum motion of said translation arm into circular motion transferred to the associated one of said crankpins of said crankshaft to rotate said crankshaft.

11. The apparatus according to claim 7, further comprising a locking arm being pivotally coupled to one of said handle assemblies and being selectively extendable into a deployed position extending between one of said handle assemblies and engaging the other of said handle assemblies to inhibit pivoting of one of said handle assemblies with respect to the other one of said handle assemblies.

12. The apparatus according to claim 11, further comprising a latch pin being coupled to said locking arm to facilitate rotation of said locking arm between said deployed position and said stored position.

* * * * *